Oct. 23, 1945.  H. W. MOYER  2,387,404

FOUR PLACE SLIDE RULE

Filed Dec. 6, 1944

Inventor

Howard W. Moyer

By Frease and Bishop

Attorneys

Patented Oct. 23, 1945

2,387,404

UNITED STATES PATENT OFFICE 2,387,404

FOUR-PLACE SLIDE RULE

Howard W. Moyer, Warren, Ohio

Application December 6, 1944, Serial No. 566,784

4 Claims. (Cl. 235—70)

The invention relates generally to slide rules in which one part bearing a scale is longitudinally slidable relative to another part bearing a similar scale, and including a runner piece horizontally slidable longitudinally with respect to both scales and having a hair line extending across the scales for facilitating readings thereon.

The ordinary logarithmic slide rule can be used to indicate calculations to only three places or digits, and in taking readings at the right hand end of the rule, the graduations are so close together as to make the reading of the third place inaccurate.

It is an object of the present invention to provide an improved slide rule which will enable accurately reading an additional place or digit, so that where the ordinary slide rule reads accurately to three places, the present improved slide rule will read accurately to four places.

It has been proposed to provide vertical lines extending from the major graduations at one edge of the scale to the opposite edge, and then to provide diagonal lines connecting the upper ends of the vertical lines with the lower ends of the next adjacent lines; and to provide vertically spaced horizontal graduations on the runner piece for intersecting the diagonal lines, so as to enable the reading of the position of the vertical hair line with respect to the scales with somewhat greater accuracy.

In such a construction, however, it is very difficult to read the exact position of the intersection of the vertical hair line with a diagonal line, with respect to the horizontal graduations on the runner piece, because such reading requires determining the position of the intersection of three lines.

It is a further object of the present invention to provide a novel means vertically slidable on the horizontally slidable runner piece, whereby the position of the vertical hair line is quickly and accurately read to four places by reading the position of the vertically slidable piece on the horizontal runner.

Other objects include the provision of a simply and inexpensively constructed slide rule which is easily operated, and which is applicable to replace various types of slide rules used for different purposes.

In the drawing I have shown the invention applied to a simple logarithmic slide rule, but it will be understood that invention may be applied to other types of slide rules for obtaining a variety of calculations, without departing from the scope of the invention as defined in the appended claims.

Referring to the drawing.

Similar numerals refer to similar parts throughout the several views of the drawing.

Figure 1:
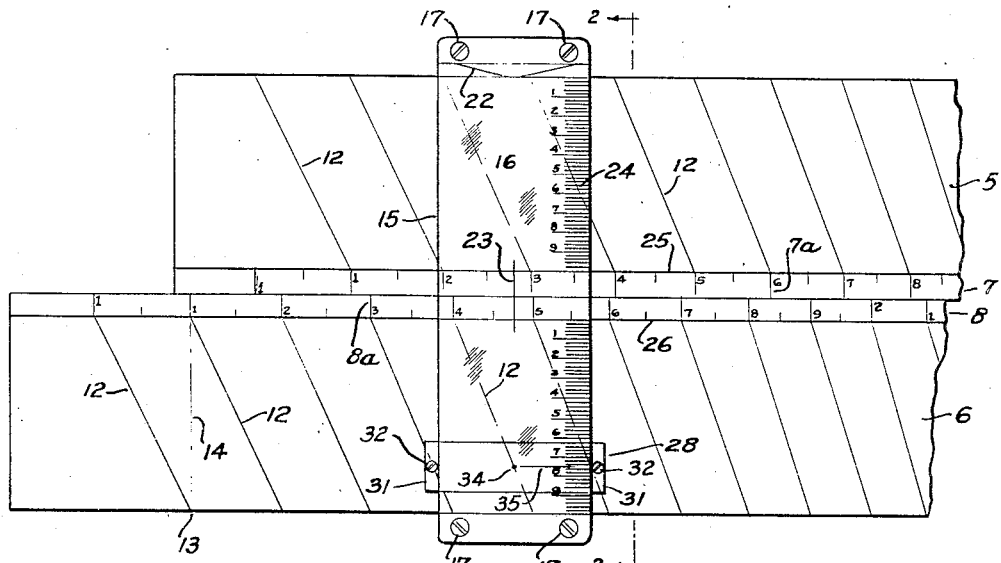
Figure 1 is an enlarged fragmentary plan view of a logarithmic slide rule embodying the present invention.

While I have shown a preferred form of the invention by way of example in the drawing, it is obvious that various modifications in construction can be made within the scope of the appended claims.

The improved slide rule includes two parts or scales 5 and 6 which are normally held in a horizontal position and slidably connected at their inner edges 7 and 8 respectively, so as to be laterally contiguous and longitudinally movable relative to each other.

Figure 2:
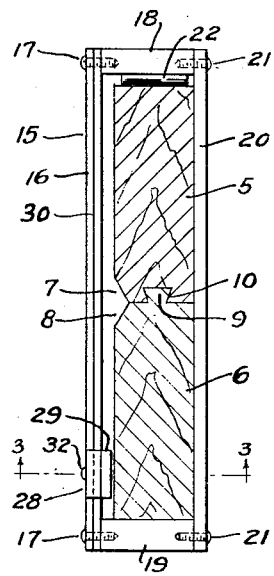
Fig. 2 is a transverse sectional view thereof, taken on line 2—2, Fig. 1.
Figure 3:
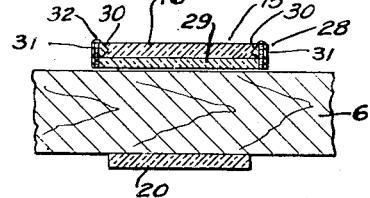
Fig. 3 is a fragmentary sectional view taken on line 3—3, of Fig. 2.
Figure 4:
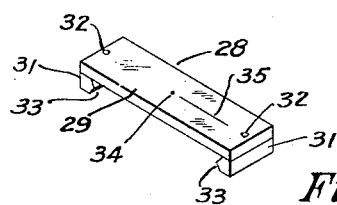
Fig. 4 is a perspective inverted view of the novel runner piece which is mounted for vertical sliding movement on the horizontally movable runner.

As shown in Figure 2, the upper edge of the scale 6 may have a dove-tail rib 9 projecting upwardly therefrom and fitting in a dove-tail groove 10 in the lower edge of scale 5 for joining the scales together while permitting longitudinally sliding movement thereof. Preferably, the adjoining edges 7 and 8 of the scales are beveled as shown, and the beveled surfaces are marked with a number of graduations, which may be logarithmic graduations as indicated at 7a and 8a respectively.

Obviously, the opposite sides of the scales 5 and 6 may be provided with other graduations at their adjoining edges so that different calculations may be read on the opposite side of the scales, if desired.

At least one of the scales 5 and 6, and preferably both, are provided with inclined lines indicated at 12 which connect their major graduations on the beveled edge of the scale with points on the laterally opposite edge of the scale. These points on the opposite edge of the scale are vertically aligned each with the major graduation which is next adjacent to the graduation at the other end of inclined line. For example, the first inclined line 12 on the lower scale 6 extends from the graduation 1 at the upper beveled edge of said scale downwardly to a point 13 on the lower edge which is vertically below the next adjacent graduation 1 on the upper beveled edge, as indicated by the dot-dash line 14.

A transparent runner member indicated generally at 15 is provided for engirdling both of the scales 5 and 6 and for sliding longitudinally along the same. The runner may include a front plate of glass or other transparent material 16, which is attached as by screws 17 to top and bottom spacer pieces 18 and 19. Similarly, a back plate 20 extends across both scales and is attached to the spacer pieces 18 and 19 as by screws 21.

Obviously, if the back sides of the scales 5 and 6 are provided with graduations, the back plate 20 of the runner will be transparent so that the graduations can be seen through the plate 20. Preferably, a flat spring member 22 is provided between the upper spacer piece 18 and the upper edge of the scale 5 for resiliently holding the runner in any adjusted position.

For the purpose of reading the relative position of the scales 5 and 6, the front transparent plate 16 of the runner is provided with a central vertical hair line 23 in a usual manner. Additionally, the front plate 16 is provided with vertically spaced horizontal graduations indicated generally at 24, and these graduations may be along one edge of the piece 16 or in a vertical zone which is spaced horizontally or laterally from the vertical hair line 23.

The graduations 24 divide the vertical distance from the beveled edges 25 and 26 respectively, to the opposite edges of the scales into a number of equal spaces, so that if the position of the intersection of the plane of the vertical hair line 23 with one of the inclined lines 12 is read on the vertical graduations 24, the position of the vertical hair line on the scales 7a or 8a with respect to the major graduations can be accurately determined.

Since the graduations 24 are necessarily very fine or closely spaced, if the vertical hair line 23 were extended vertically and the graduations 24 were extended horizontally to intersect the vertical hair line 23, it would be very difficult and confusing to read the position of the intersection of the three lines at the same time, that is, the intersection of the vertical hair line with one of the inclined lines 12 and with one of the graduations 24.

I have provided a novel means for facilitating the reading of the intersection of the hair line 23 with one of the inclined lines 12 with respect to the graduations 24. To this end, I preferably extend the spacers 18 and 19 upwardly so as to provide a narrow space between the front plate 16 and the front sides or surfaces of the scales 5 and 6. A vertical sliding piece indicated generally at 28 is mounted on the front plate 16 of the runner, and the vertical slide 28 includes a transparent plate 29 which lies across and under the front plate 16.

The slide 28 may be movably mounted on the plate 16 by providing V-shaped grooves 30 in the edges of the plate 16 and attaching spacer pieces 31 to the plate 29 by screws 32, which spacer pieces have inwardly projecting V-shaped ribs 33 slidably received in the grooves 30. The slide 28 may be mounted on the plate 16 before plate 16 is attached to the spacer pieces 18 and 19.

Preferably the plate 29 of the slide 28 is provided on its underside with a small black dot indicated at 34 which always registers with the plane of the hair line 23 of the plate 16, as the slide 28 is moved up and down thereon. A horizontal hair line 35 is provided on the plate 29 and extends from a point closely adjacent to the dot 34 into the area or region of the overlying graduations 24 so that position of the dot with respect to the graduations is easily determined at a glance. By positioning the dot 34 on the underside of the plate 29, it is closely adjacent the inclined lines 12 so as to avoid distortion in reading the position of the dot through the glass plates 16 and 29.

In the operation of the improved slide rule, when the scales 5 and 6 have been moved to a desired position, the dot 34 is made to register with the intersection of the plane of vertical hair line 23 and the inclined line 12 positioned under the same, and by reading the position of the dot with respect to the vertical graduations 24, the relative position of the scales to four places is quickly read. In the position of Fig. 1, the vertical hair line 23 is between the major graduations 4 and 5 of the scale 6 and its intersection with the inclined line 12 thereunder is indicated by the horizontal hair line 35 to be at .75 of the distance between the upper beveled edge 26 and the opposite edge of scale 6, or .75 of the distance between the graduations 4 and 5. Thus, the reading for the position of the scales in Fig. 1 is 1475.

Any position of the scales 5 and 6 relative to each other can be quickly and accurately determined in a similar manner, to an additional place as compared with the usual slide rule.

The improved slide rule is simply and inexpensively constructed and easily operated, and is applicable to various types of slide rules which include scales used for a number of different purposes.

I claim:

1. A slide rule including two normally horizontal laterally contiguous scales slidable longitudinally relative to each other and having graduations on their adjoining edges, at least one of said scales having inclined lines connecting said graduations with points on its opposite edge vertically aligned with the next adjacent graduations, a transparent runner slidable longitudinally along said scales and having a central vertical line for intersecting said inclined lines and having horizontal graduations along its vertical edge, and a transparent slide piece vertically movable on said runner and having a horizontal line substantially intersecting said vertical line and extending to said horizontal graduations.

2. A slide rule including two normally horizontal laterally contiguous scales slidable longitudinally relative to each other and having graduations on their adjoining edges, at least one of said scales having inclined lines connecting said graduations with points on its opposite edge vertically aligned with the next adjacent graduations, a transparent runner slidable longitudinally along said scales and having a central vertical line for intersecting said inclined lines and having horizontal graduations along its vertical edge, and a transparent slide piece vertically movable on said runner, said slide piece having a dot registering with said vertical line of the runner, and a horizontal line on the slide piece extending from said dot to said horizontal graduations.

3. In a slide rule having relatively movable scales and a runner thereon, inclined lines connecting graduations on the upper edge of one scale with points on its lower edge vertically below the next adjacent graduations, a vertical hair line on said runner and vertically spaced graduations longitudinally spaced from said hair line, and a slide piece vertically movable on said runner and having a horizontal hair line for indicating the position of the intersection of said inclined and vertical hair lines with respect to said vertically spaced graduations.

4. In a slide rule having relatively movable scales and a runner thereon, inclined lines connecting graduations on the upper edge of one scale with points on its lower edge vertically below the next adjacent graduations, a vertical hair line on said runner and vertically spaced graduations longitudinally spaced from said hair line, and a slide piece vertically movable on said runner and having a dot for registering with the intersection of said vertical hair line and one of said inclined lines, and a horizontal line on said slide piece extending to said vertically spaced graduations.

HOWARD W. MOYER.